US006922034B2

(12) United States Patent
Hirose (10) Patent No.: US 6,922,034 B2
(45) Date of Patent: Jul. 26, 2005

(54) METHOD FOR DESIGNING A ROBOT ARM (75) Inventor: Masato Hirose, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 6 days.

(21) Appl. No.: 09/988,033

(22) Filed: Nov. 16, 2001

(65) Prior Publication Data

US 2002/0089296 A1 Jul. 11, 2002

(30) Foreign Application Priority Data

Nov. 17, 2000 (JP) ........................................ 2000-351690

(51) Int. Cl.[7] ............................. B25J 9/18; G05B 19/19
(52) U.S. Cl. ............. 318/568.11; 318/560; 318/568.19; 318/574
(58) Field of Search ................................. 318/560, 567, 318/568.1, 568.11, 568.12, 568.17, 568.19, 568.2, 568.21, 574, 625, 626, 687

(56) References Cited

U.S. PATENT DOCUMENTS

| | | | | |
|---|---|---|---|---|
| 4,445,184 A | * | 4/1984 | Noguchi ................ | 318/568.13 |
| 4,594,670 A | * | 6/1986 | Itoh ...................... | 318/568.22 |
| 4,675,502 A | * | 6/1987 | Haefner et al. ............. | 318/574 |
| 4,683,406 A | * | 7/1987 | Ikeda et al. .............. | 318/568.2 |
| 4,879,663 A | | 11/1989 | Fuehrer | |
| 4,937,759 A | * | 6/1990 | Vold ........................... | 700/262 |
| 4,943,759 A | * | 7/1990 | Sakamoto et al. ..... | 318/568.11 |
| 4,967,126 A | * | 10/1990 | Gretz et al. ............ | 318/568.19 |
| 4,990,839 A | * | 2/1991 | Schonlau ............... | 318/568.15 |
| 5,430,643 A | * | 7/1995 | Seraji ..................... | 318/568.11 |
| 5,737,500 A | * | 4/1998 | Seraji et al. ........... | 318/568.11 |

FOREIGN PATENT DOCUMENTS

| | | |
|---|---|---|
| DE | 2 228 598 | 3/1974 |
| EP | 1 050 383 A1 | 8/2000 |

OTHER PUBLICATIONS

Nishtwaki, K. et al. "Generation of Reactive Stepping Motion for a Humanoid by Dynamically Stable Mixture of Pre–designed Motions", Systems, Man, and Cybernetics, 1999. IEEE SMC '99 Conference Proceedings. 1999 IEEE International Conference on Tokyo, Japan, Oct. 12–15, 1999; pp. 902–907.

Marjanovic, M. et al. "Self–Taught Visually–Guided Pointing for a Humanoid Robot", From Animals to Animats 4. Proceedings of the Fourth International Conference on Simulation of Adaptive Behavior, Proceedings of Fourth International Conference on Simulation of Adaptive Behaviour from Animals to Animats, North Falmouth, MA, USA; 1996, pp. 35–44.

* cited by examiner

*Primary Examiner*—Marion Fletcher
(74) *Attorney, Agent, or Firm*—Arent Fox PLLC (57) ABSTRACT

Provided is an arm structure for a robot which can favorably carry out jobs which are typically performed by humans. By determining the length of the arm and the height of the axis of rotation of the arm in such a manner that a range of rotational motion of the arm in accessing the region can be covered by a range in which the fore-and-aft distance to the tip of the arm can be linearly approximated, even though the trajectory of the arm is approximated by a line, the error in the distance to the object can be limited within a prescribed range, and the practicality and economy of computation can be achieved at the same time.

7 Claims, 7 Drawing Sheets

Fig. 7

METHOD FOR DESIGNING A ROBOT ARM

TECHNICAL FIELD

The present invention relates to an arm structure for a robot which stands upright and bipedally or otherwise capable of traveling, and in particular to an arm structure having an improved capability to access an object in the front by using a fully extended arm and a method for designing the same.

BACKGROUND OF THE INVENTION

The conventional robots were generally specialized for specific functions, but there is a growing demand for robots which are more similar to humans and are given with a greater versatility. In particular, with the advance in the development of CPUs and programming technology, various upright bipedal or otherwise traveling robots have been proposed. Such robots are capable of serving various practical purposes in homes, work places and fairs. Because such robots are intended to perform jobs which are normally performed by humans, it is necessary and desirable for such a robot to be able to access objects which are required for performing such jobs both quickly and accurately.

In particular, when a robot attempts to reach an object in front of it with a fully extended arm, the fact that the arm undergoes an arcuate motion depending on the angular deviation from a horizontal position of the arm makes the arithmetic computation for controlling the fore-and-aft distance between the free end of the arm or the hand and the object in the front highly complex. If the arm length is increased, the problem associated with the arcuate motion of the arm is reduced, but it detracts from the compact design of the robot. Conversely, if the arm length is reduced excessively, the work efficiency is impaired. It is therefore important to determine the length of the arm in a rational way.

Also, if the arm is controlled by fully taking into account the arcuate motion of the arm, the burden on the CPU increases particularly in an upright walking bipedal robot. In the access control of such an arm, it is desirable to minimize the burden on the CPU.

BRIEF SUMMARY OF THE INVENTION

In view of such problems of the prior art and the recognition by the inventors, a primary object of the present invention is to provide an arm structure for a robot which can favorably carry out jobs which are typically performed by humans.

A second object of the present invention is to provide an arm structure for a robot which can minimize the burden on the CPU when accessing an object in the front with an arm.

A third object of the present invention is to provide a method for designing such an arm structure for a robot.

According to the present invention, such objects can be accomplished by providing a method for designing an arm structure for a robot having an arm which can rotate vertically and forward over a prescribed angle around an axial line extending substantially between two shoulders, comprising the steps of: defining a vertical extent of a region in front of the robot that can be accessed by the arm in a fully extended state; and determining a length of the arm and a height of the axis of rotation of the arm in such a manner that a range of rotational motion of the arm in accessing the region can be covered by a range in which the fore-and-aft distance to the tip of the arm can be linearly approximated.

Thus, even when the trajectory of the arm is approximated by a straight line, the error in the distance to the object can be limited within a prescribed range, and the practicality and economy of computation can be achieved at the same time.

In such an arm structure for a robot, by selecting the height of the axis of rotation of the arm to be about 910 mm and allowing the hand to reach 240 mm both below and above this level, it is possible for the robot to reach most of the objects which are intended to be accessed by human hands.

For instance, if the length of the arm is no less than 365 mm and the moveable angle of the arm with respect to a horizontal line is no less than 42 degrees, it is possible for the robot to reach any object in this vertical range while the necessary control algorithm for such a control is simplified because the motion of the free end of the arm or the hand can be safely approximated by a straight line instead of an arcuate curve without giving rise to an error of any more than 25 mm in the fore-and-aft distance.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
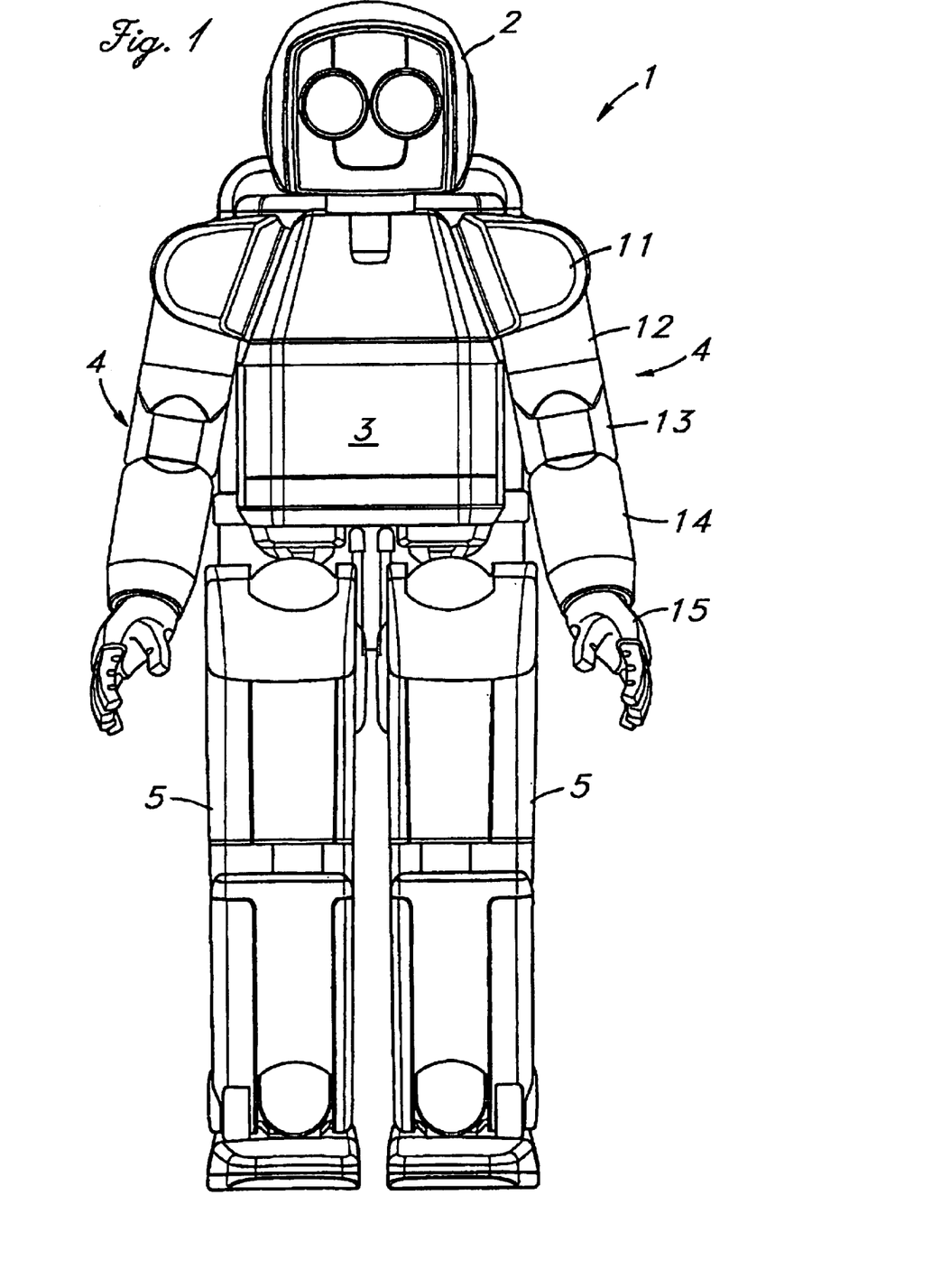
FIG. 1 is a front view of a humanoid robot embodying the present invention.
Figure 2:
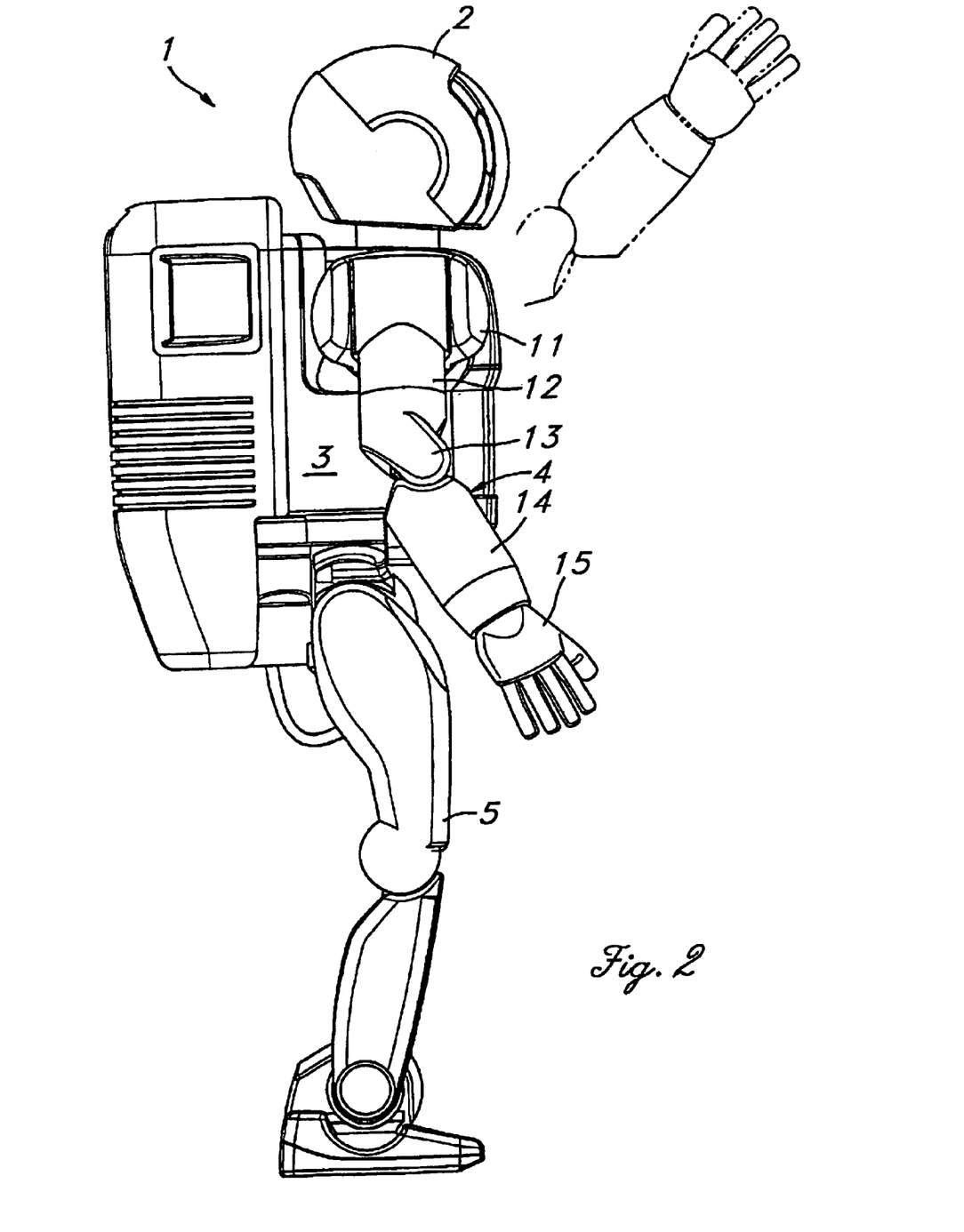
FIG. 2 is a left side view of the humanoid robot embodying the present invention.
Figure 3:
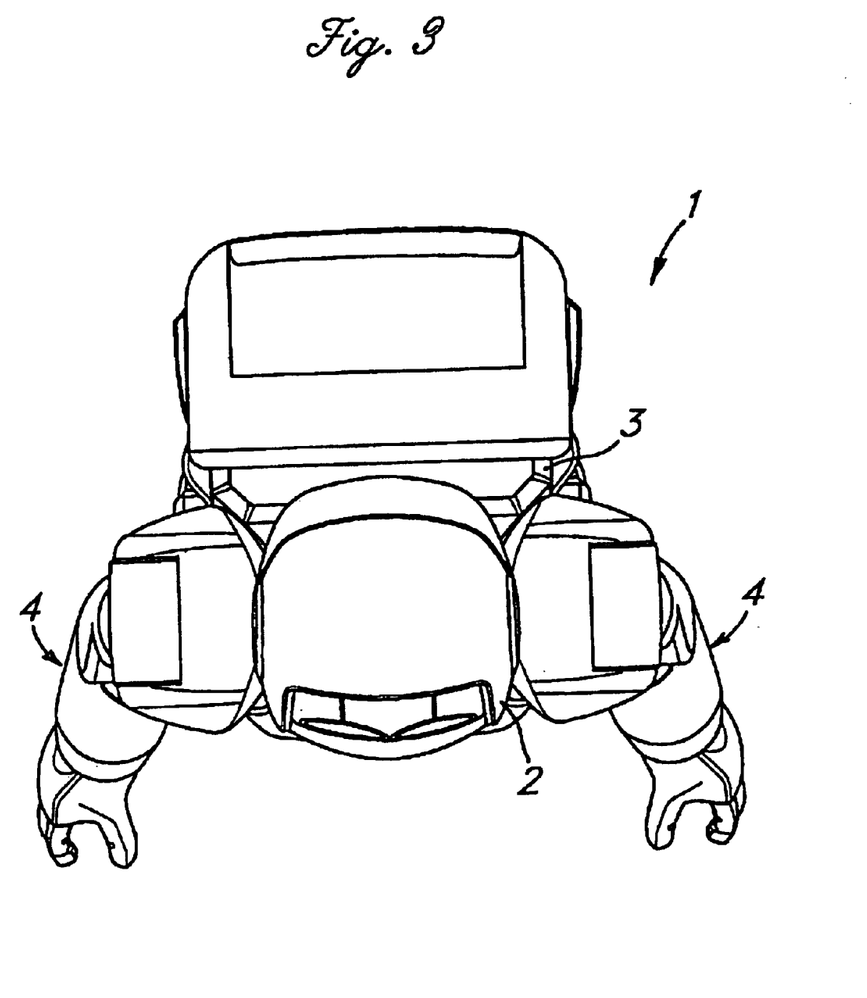
FIG. 3 is a top view of the humanoid robot embodying the present invention.

FIGS. 1 to 3 show the overall external appearance of a humanoid robot embodying the present invention. This robot 1 is modeled after a lower grade primary school child, and comprises a head 2 incorporated with a visual unit and a speech unit, a body 3 supporting a control unit and incorporated with batteries, and two legs 5 each having joints so as be able to move substantially in the same way as human legs. The robot is thus adapted to walk on two feet.

Figure 4:
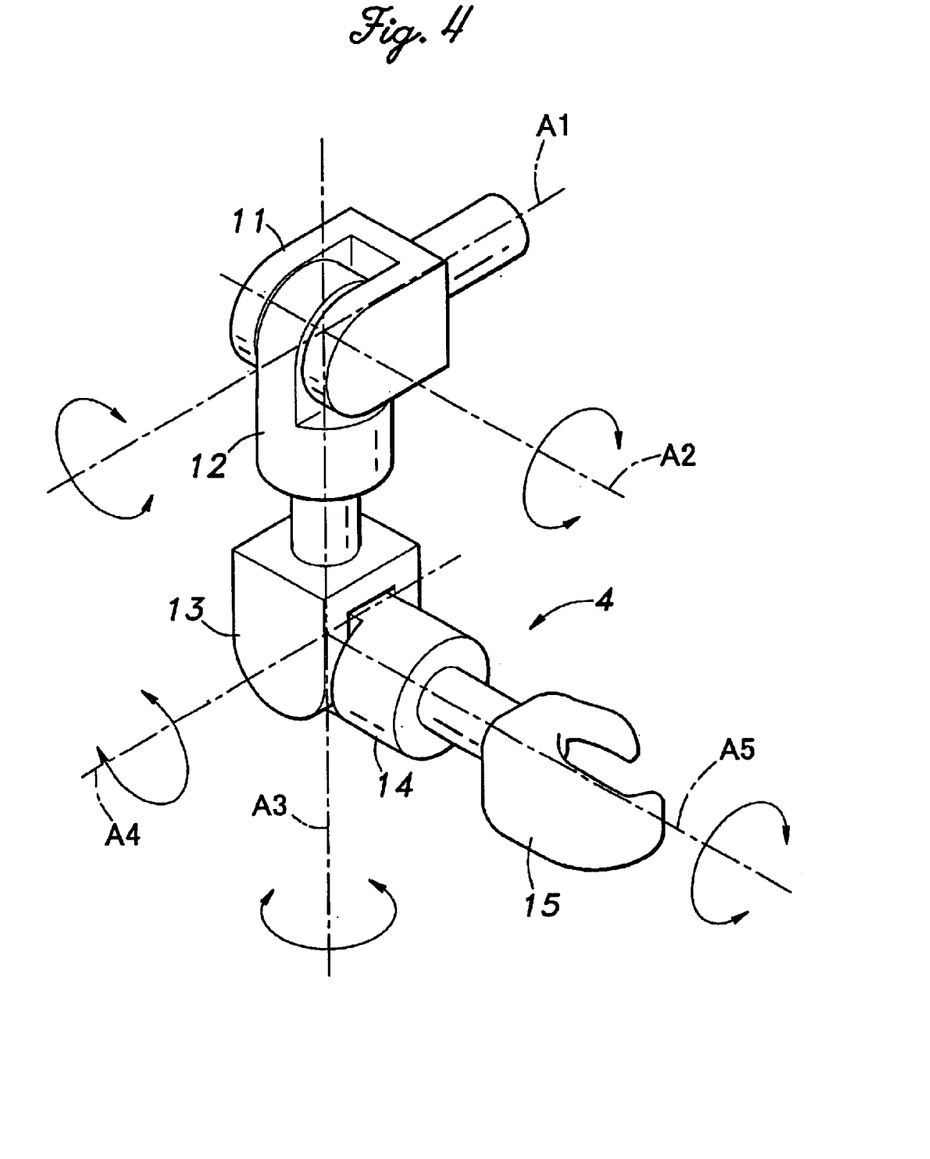
FIG. 4 is a model diagram for explaining the possible motions of the arm.

The arm 4 of this robot 1 is described in more detail with reference to FIG. 4. This arm 4 comprises a shoulder joint 11 attached to a body 3 so as to be rotatable around a laterally extending axis A1, an upper arm 12 attached to the shoulder joint 11 so as to be rotatable around a fore-and-aft extending axis A2, an elbow joint 13 attached to the upper arm 12 so as to be rotatable around a longitudinal axis A3 of the upper arm 12, a forearm 14 attached to the elbow joint 13 so as to be rotatable around an axis A4 perpendicular to the longitudinal axis A3 of the upper arm 12, and a hand 15 attached to the forearm 14 so as to be rotatable around a longitudinal axis A5 of the forearm 14.

Each of the rotatable parts is incorporated with a rotary actuator powered by an electric motor, for instance. The arm 4 as a whole can be swung in both the fore-and-aft and lateral directions around the shoulder joint 11. The forearm 14 can be bent relative to the upper arm 12 via the elbow joint 13, and can also be twisted relative to the upper arm 12. Thus, both the upper arm 12 and forearm 14 are capable of a twisting motion, and the arm can effect a desired motion by combining these motions.

Measurements were made on various objects which a robot is expected to handle in work places and homes, and the results are tabulated in the following table.

TABLE 1

| work objects | height (cm) |
| --- | --- |
| office table | 1110 |
| handrail | 1100 |
| facsimile table | 1060 |
| elevator pushbuttons | 1050 |
| door knob | 1050 |
| writing counter | 950 |
| copying machine | 960 |
| high table | 900 |
| counter | 900 |
| telephone | 900 |
| pushcart handle | 840 |
| newspaper rack | 835 |
| kitchen sink | 800 |
| work table | 740 |
| desk | 700 |
| smoking stand | 600 |
| guest box | 600 |
| lounge service table | 500 |
| coffee table | 500 |
| wall outlet | 250 |
| bed | 450 |

Based on such data, it was concluded that most of the objects that are required to be handled by reaching out the arm forward while standing can be covered by selecting a vertical range of from 670 mm to 1,150 mm as a range that can be reached by the robot arm. Therefore, the height of the axial line $H_0$ was selected at 910 mm as a midway point between the heights of 670 mm and 1,150 mm.

Figure 5:
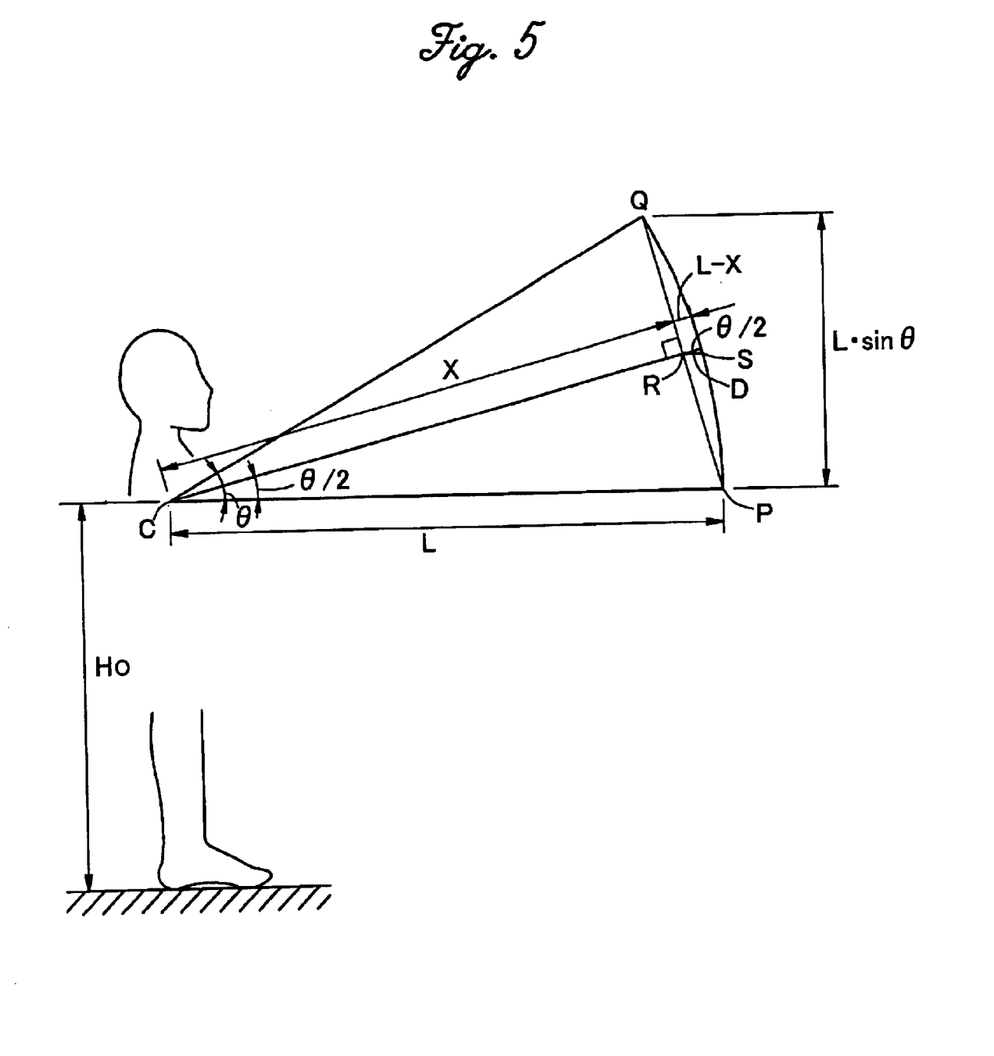
FIG. 5 is a diagram explaining the geometrical relationship regarding the arm.

When the arm is swung forward to reach an object in the front, the tip of the arm of the hand follows an arcuate path. However, mathematically representing an arcuate path requires a significant amount of computation, and it is therefore desirable to approximate the path of the hand with a straight line to reduce the burden on the CPU of the control unit of the robot. The maximum error D in the fore-and-aft distance to the object to be accessed due to such a linear approximation can be computed by the equation given below. More specifically, suppose that the axial line passing through the shoulders is C, the center of the hand at the free end of the fully extended arm is P, and the arm is swung around this axial line upward in its fully extended condition until the center of the hand reaches point Q. The maximum error D in the fore-and-aft distance to the object to be accessed can be given as the horizontal distance from the center R of the line PQ to the arcuate path (S) of the center of the hand.

If the length of the arm or the line CP or CQ is L and the length of the line CR is X, the following two equations can be obtained.

$$X = L \cos(\theta/2)$$

$$L - X \approx D \cos(\theta/2)$$

If X is canceled from these equations, one obtains $$L\{1-\cos(\theta/2)\} = D \cos(\theta/2)$$

or $$D/L = \{1-\cos(\theta/2)\}/\cos(\theta/2) \qquad (1)$$

Figure 6:
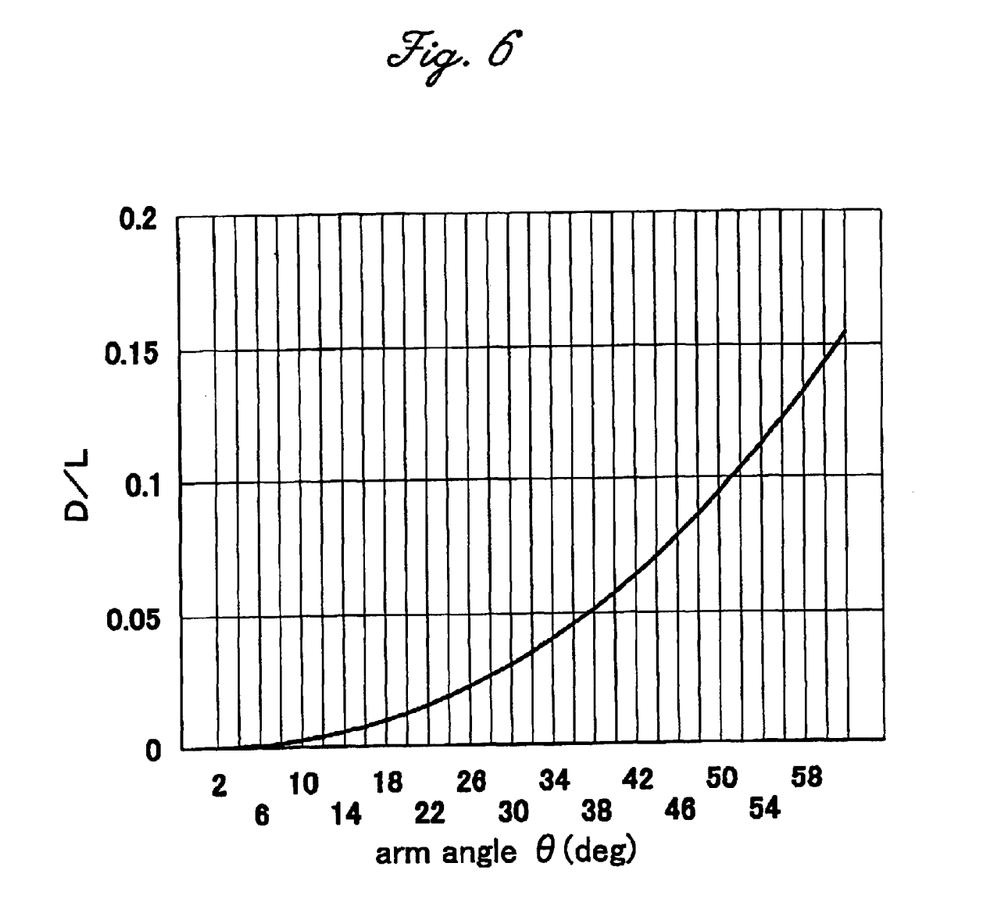
FIG. 6 is a graph showing the relationship between D/L and the rotational angle of the arm.

FIG. 6 shows the magnitude of D/L in relation to θ. The height H of the free end of the arm when the arm has been swung upward by angle θ can be given by the following equation.

$$H = L \sin \theta + H_0 \qquad (2)$$

In this case, it is determined that H=910±240 mm, and that D may be about 25 mm when a practical precision is considered. The distance to the front object may be determined by a stereoscopic view by the two eyes of the robot. Based upon such considerations, if the maximum error D in the fore-and-aft distance to the object to be accessed is 25 mm, θ=42 degrees, and L=365 mm can be obtained by numerically solving equations (1) and (2). At this time, D/L=0.0711. Therefore, (1) by selecting the height of the shoulder or the rotational axial line of the arm to be 910 mm and allowing the arm to be able to swing vertically by 240 mm both upward and downward from a horizontal line, the robot arm can reach most of the objects which a human hand is expected to reach; and (2) by selecting the arm length to be no less 365 mm and allowing the arm to be able to swing vertically at least by 42 degrees both upward and downward from a horizontal line in the case where a fore-and-aft error of 25 mm is tolerated, not only the robot arm can reach most of the objects which a human hand is expected to reach but also the motion of the hand can be successfully approximated with a straight line.

Figure 7:
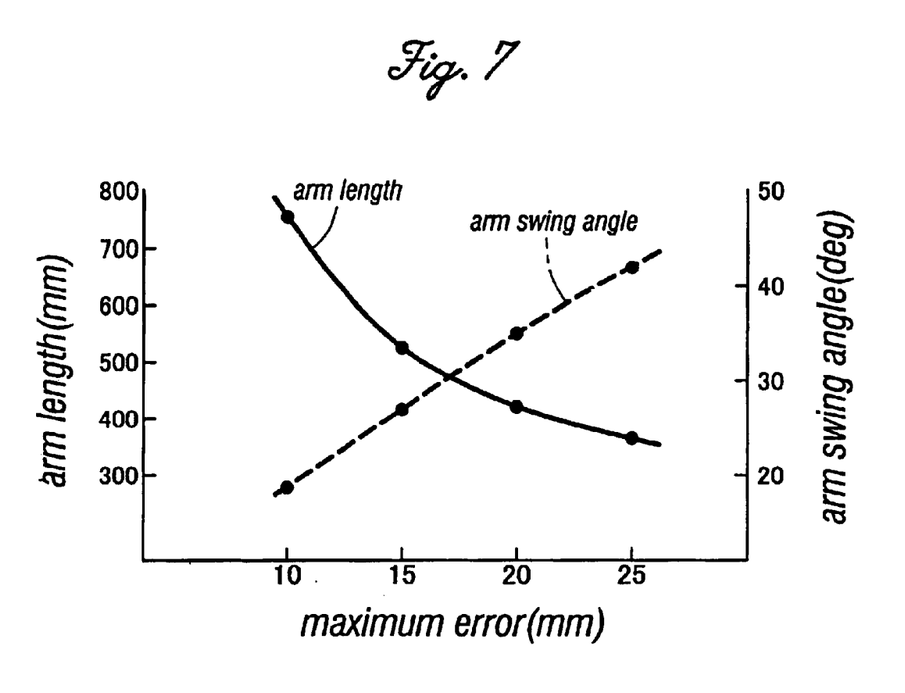
FIG. 7 is a graph showing the relationship between the tolerated distance error and the necessary arm length as well as the possible range of the swing angle of the arm.

The present invention is not limited by the particular numerical values of the foregoing embodiment, but may be varied depending of the way the work area is defined. Also, the desirable arm length and the arm swing angle can vary depending on the tolerated error of the fore-and-aft distance of the hand. The table given below and the graph given in FIG. 7 tabulate and summarize the minimum arm length and arm swing angle for different values of the tolerated distance error.

TABLE 2

| maximum error (mm) | arm length (mm) | arm swing angle (degrees) |
| --- | --- | --- |
| 10 | 754 | ±18.6 |
| 15 | 528 | ±27 |
| 20 | 422 | ±35 |
| 25 | 365 | ±42 |

According to the present invention, the optimum length of the robot arm can be determined, and this allows an arm structure to be constructed which is practical and minimizes the burden on the CPU.

Although the present invention has been described in terms of a preferred embodiment thereof, it is obvious to a person skilled in the art that various alterations and modifications are possible without departing from the scope of the present invention which is set forth in the appended claims.

What is claimed is:

1. A method for designing an arm structure for a robot having an arm which can rotate vertically and forward over a prescribed angle around an axial line extending substantially between two shoulders, the method comprising:

selecting a vertical region in front of the robot to be accessed by the arm in a fully extended state, the location of the selected vertical region being determined with respect to a reference plane;

selecting a height of the axis of rotation of the arm as a midway point between an upper end and a lower end of the selected region;

approximating an arcuate path of a free end of the arm caused by rotational motion of the arm in accessing the selected region with a straight line that passes through a position of the free end of the arm extending in a horizontal direction and a position of the free end of the arm for accessing the upper or lower end of the selected region, and selecting a length of the arm so that a maximum error between a linearly approximated for-and-aft distance to the free end of the arm based on the straight line approximating the arcuate path of the free end of the arm and an actual for-and-aft distance to the free end of the arm based on the arcuate path of the free end of the arm is smaller than a prescribed maximum tolerated error.

2. A method for designing an arm structure for a robot according to claim 1, wherein a height of the axis of rotation of the arm is 910 mm, and the arm swings vertically at least by 240 mm at its free end both upward and downward from a horizontal line.

3. A method for designing an arm structure for a robot according to claim 1, wherein the maximum tolerated error of the fore-and-aft distance of the free end of the arm is 15 mm, and the arm is at least 528 mm long, and swings at least ±27 degrees from a horizontal line.

4. A method for designing an arm structure for a robot according to claim 1, wherein the maximum tolerated error of the fore-and-aft distance of the free end of the arm is 20 mm, and the arm is at least 422 mm long, and swings at least ±35 degrees from a horizontal line.

5. A method for designing an arm structure for a robot according to claim 1, wherein the maximum tolerated error of the fore-and-aft distance of the free end of the arm is 25 mm, and the arm is at least 365 mm long, and swings at least ±42 degrees from a horizontal line.

6. An arm for a robot comprising:

an arm capable of being attached to a robot shoulder which can rotate vertically and forward over a prescribed angle around an axial line extending from the shoulder, wherein:

a height of the axis of rotation of the arm is about 910 mm, and the arm swings vertically at least by 240 mm at its free end both upward and downward from a horizontal line extending through the axis of rotation;

an arcuate path of a free end of the arm caused by rotational motion of the arm in accessing a selected vertical region of ±240 mm upward and downward from the horizontal line extending through the axis of rotation is approximated with a straight line that passes through a position of the free end of the arm extending in a horizontal direction and a position of the free end of the arm for accessing the upper or lower end of the selected region; and a length of the arm is selected so that a maximum error between a linearly approximated for-and-aft distance to the free end of the arm based on the straight line approximating the arcuate path of the free end of the arm and an actual for-and-aft distance to the free end of the arm based on the arcuate path of the free end of the arm is smaller than a prescribed maximum tolerated error.

7. An arm for a robot according to claim 6, wherein the arm is at least 365 mm long, and swings at least ±42 degrees from a horizontal line.

* * * * *